United States Patent
Thomson et al.

[11] 3,895,690
[45] July 22, 1975

[54] LUBRICATOR ASSEMBLY WITH AUTOMATIC RESET

[75] Inventors: Ronald E. Thomson, Cambridge; Philip J. Kast, Madison, both of Wis.

[73] Assignee: Madison-Kipp Corporation, Madison, Wis.

[22] Filed: Mar. 12, 1974

[21] Appl. No.: 450,330

[52] U.S. Cl............ 184/15 A; 308/5 R; 308/DIG. 9
[51] Int. Cl............................................. F16n 13/16
[58] Field of Search............ 184/15 R, 15 A, 49, 64, 184/2, 101, 102; 308/78, 5 R, 84, 1 A, 93, 108, 112, 116, 122, 168, DIG. 9; 73/265

[56] References Cited
UNITED STATES PATENTS
2,990,916   7/1961   Hillard et al...................... 184/15 A

*Primary Examiner*—Richard C. Pinkham
*Assistant Examiner*—William R. Browne
*Attorney, Agent, or Firm*—Merriam, Marshall, Shapiro & Klose

[57] ABSTRACT

An automatic lubricator for lubricating the wheels in a conveyor assembly, including automatic safety cut-out and reset device which is activated in the event the lubricator fails to disengage from a moving conveyor. The lubricator includes a carriage rotatably and slidably mounted on an elongated guide rod arranged parallel to the conveyor track. In normal operation, the carriage is prevented from rotating under the influence of gravity by a support roller which rests on a support bar parallel to the guide rod. If the carriage is carried by the moving conveyor beyond the point at which the lubricator should disengage from the conveyor, the support roller drops into a notch in the support rod, permitting the carriage to swing free and disengage from the conveyor. The notch is provided with a downwardly inclined support surface which returns the support roller to normal position on the support bar as the carriage is returned to the start position by a carriage return system, thereby resetting the lubricator for continued operation. The lubricator also may have a locator for the lubricator that is operatively connected to a rotary valve which is actuated by a pneumatic control system of the lubricator.

5 Claims, 6 Drawing Figures

LUBRICATOR ASSEMBLY WITH AUTOMATIC RESET

This invention relates to a lubricator for trolley wheels such as those in an overhead conveyor system or the like which automatically lubricates each trolley wheel as it passes the lubricator. More particularly, it relates to an automatic lubricator which is provided with a safety cut-out system which automatically disengages the lubricator from the trolley when a malfunction occurs and automatically resets itself for reengagement after the cause of the malfunction has been eliminated.

BACKGROUND OF THE INVENTION

In U.S. Pat. No. 2,909,916, issued July 4, 1961, there is described an automatic lubricator system for lubricating the wheels in an overhead trolley system such as that used in a painting conveyor assembly or the like. As described in the patent, the system comprises an elongated guide rod arranged parallel to a conveyor track and a carriage rotatably mounted on the guide means and slidable along its length. On the side of the carriage facing the conveyor track there is attached a locator rod for engaging the trolley as it moves along the track, thus causing the carriage to slide along the guide rod on which it is mounted. As the carriage is moved along the conveyor track, there is actuated a control system which causes a lubricator fitting (coupler) to be extended from the face of the carriage into engagement with a lubrication fitting on the wheel of the trolley, through which there is injected into the wheel a suitable quantity of a lubricant.

The control system of the apparatus is designed such that after sufficient travel along the conveyor to complete the injection of the lubricant into the wheel, the locator rod and coupler are retracted, thereby disengaging the lubricator from the moving conveyor, and the carriage is returned to its starting position for engaging the next wheel in the conveyor system to repeat the cycle.

In order to prevent damage to the lubricator in the event that the locator rod and/or coupler fail to retract for any reason after lubrication of a wheel is completed, there is provided a safety cut-out system. The lubricator is so designed that under the influence of gravity the carriage will pivot about the guide rod in a direction which causes the locator rod and coupler to swing clear of the trolley and disengage from whatever parts of the conveyor they normally contact. During normal operation of the lubricator, pivoting of the carriage about the guide rod is prevented by a support roller attached to the carriage, which roller bears against a roller support bar arranged parallel to the guide rod. At a point in the travel of the carriage beyond that at which the locator rod and coupler would normally have disengaged themselves from the conveyor, there is provided a notch in the support bar of a size sufficient to permit the support roller to pass through, thereby permitting the carriage to pivot about the guide rod and disengage the entire assembly from the moving conveyor. At this time, the carriage is also disengaged from the return cylinder which normally returns the carriage to the start position, and the pneumatic control system is deactivated until the lubricator is reset for continued operation.

Although the operation of the safety cut-out feature described above is satisfactory in protecting the equipment against damage, it has certain disadvantages. Specifically, it is deficient in that once the cut-out is actuated the lubricating system is inoperative until such time as it is manually reset to an operative condition. In addition to the delay in the operation of the trolley system which may result from the necessity for manual reset, the location of the lubricator in an elevated or otherwise not readily accessible position in which it is used makes manual resetting an inconvenient and potentially hazardous procedure. This and other deficiencies of the lubricator of the prior art are overcome in accordance wih the present invention, which provides an automatic and practically instantaneous reset of the safety cut-out which requires significantly less attention on the part of the operator of the conveyor system, and which eliminates shut-down periods.

BRIEF DESCRIPTION OF THE INVENTION

In accordance with the invention, the prior art lubricator described in U.S. Pat. No. 2,990,916 is modified by providing an elongated "kick-out" loop connected below the notch in the roller support bar which actuates the cut-out feature, the loop providing a bearing surface for the support roller which is inclined downwardly and in the forward direction of travel of the carriage. In addition, provision is made to apply the restoring force used to return the carriage to its initial position while the safety cut-out is in operation. This is accomplished by maintaining the connection between the carriage and the return cylinder and continuing the operation of the pneumatic control system. Accordingly, when the support roller reaches and falls through the notch in the roller support bar to permit the carriage to pivot out of engagement with the conveyor, the restoring force causes the support roller, which rides on the inclined surface of the loop, to climb back out of the notch, thereby permitting the carriage to return to its operative position after the conveyor impediment has passed by the lubricating station.

BRIEF DESCRIPTION OF THE DRAWINGS

The invention will be better understood from the following detailed description thereof, taken in conjunction with the accompanying drawings, in which.

DETAILED DESCRIPTION

Figure 1:
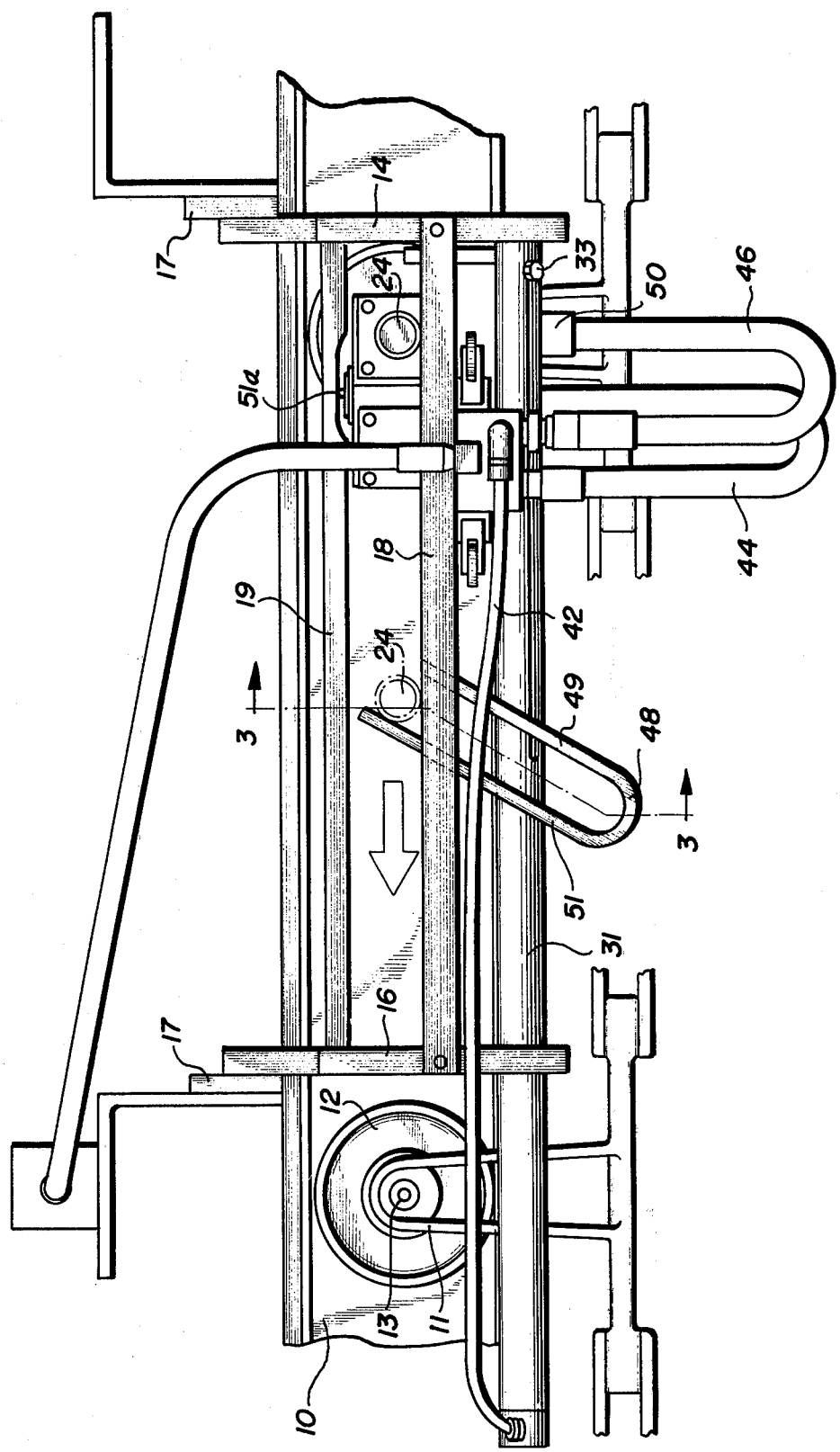
FIG. 1 is an elevational view of the apparatus of the invention installed in front of a conveyor assembly.

Referring to the drawings, the reference numeral 10 indicates a conveyor track of a paint or assembly line or the like, the track comprising an "I" beam and the trolley having a hanger 11 and trolley wheel 12 provided with a lubricant fitting 13. The assembly further includes a front end plate 14 and back end plate 16 supported on track 10 by brackets 17 and connected together by roller support bar 18, minor valve rod 19, and guide rod 21.

Figure 3:
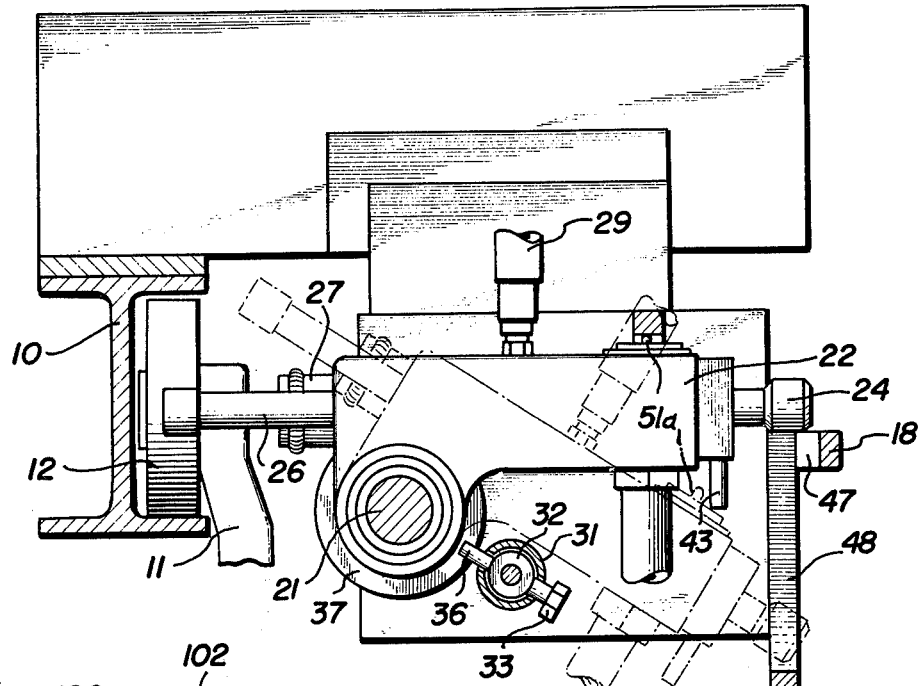
FIG. 3 is a cross-sectional view along the line 3—3 of FIG. 1.

As seen in FIG. 3, the guide rod 21 and the roller support bar 18 provide guide and support means for carriage 22, which has a bore 23 surrounding guide rod 21 and support roller 24 resting on and supported by the top surface of bar 18.

The end of carriage 22 adjacent the conveyor assembly is provided with a retractable locator rod 26 and a coupler guide 27 containing a retractable coupler 28 which coacts with lubricant fitting 13 to deliver a suitable lubricant to wheel 12. Lubricant is supplied via conduit 29 (FIG. 3) to a lubricant injection system in the interior of carriage 22 of a type shown and described in U.S. Pat. No. 2,990,910, to which reference may also be had for additional details of the control system used in the present invention.

Figure 2:
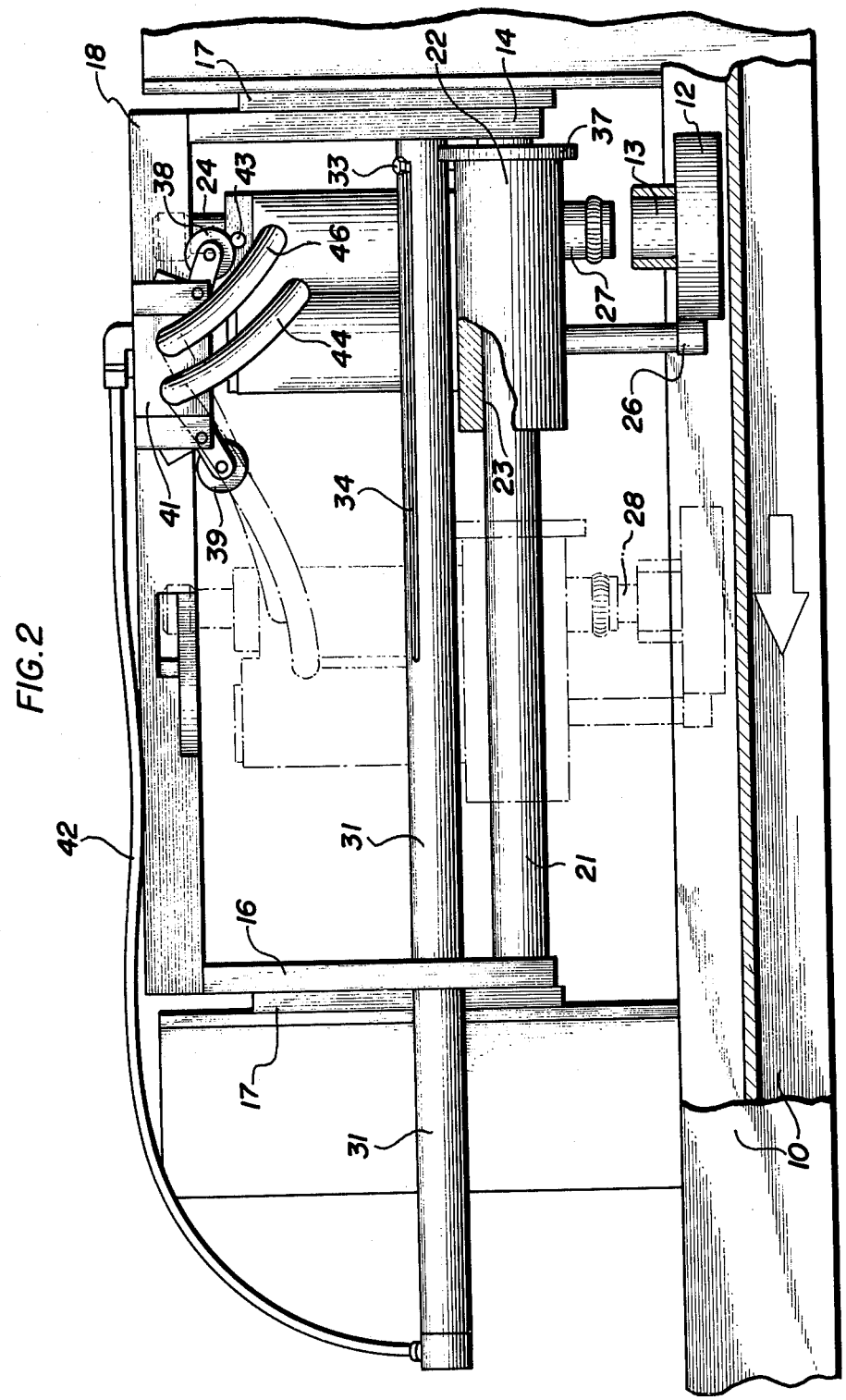
FIG. 2 is a bottom view of the assembly of FIG. 1, looking up at the installation.

In FIGS. 1 and 2, the carriage 22 is shown in position at the start of a lubricating cycle. Locator rod 26 has been extended into contact with wheel 12 which travels in the direction of the arrow. The movement of the wheel is imparted by locator rod 26 to carriage 22, causing the entire assembly attached to carriage 22 to slide along guide rod 21 and at times to reach ultimately the position shown in dotted outline in FIG. 2. During the course of the movement of carriage 22 between the extreme positions shown in FIG. 2, a control system within the interior of the carriage, similar to that shown in U.S. Pat. No. 2,990,916, causes coupler 28 to engage lubricant fitting 13 in trolley wheel 12 and to inject lubricant therein. The sequence is timed so that shortly before carriage 22 reaches the position shown in dotted outline in FIG. 2, the injection of the lubricant will normally have been completed. At the end of the injection period, the control system causes locator rod 26 and coupler 28 to be retracted and carriage 22 returned to its initial position. The return of the carriage is accomplished by return cylinder 31 containing piston 32 (FIG. 3) to which there is attached return pin 33, the ends of which extend through longitudinal slots 34 in the return cylinder. A protruding end 36 of return pin 33 bears against a circular flange 37 joined to the end of carriage 22. The actuation of return cylinder 31 is controlled by trip rollers 38 and 39 connected to master valve 41, which controls a supply of pneumatic fluid through line 42 to cylinder 31. Trip rollers 38 and 39 are designed to be actuated by trip pin 43 which extends from the body of carriage 22 at a location such that it will actuate the trip rollers as the carriage slides along guide rod 21.

Figure 6:
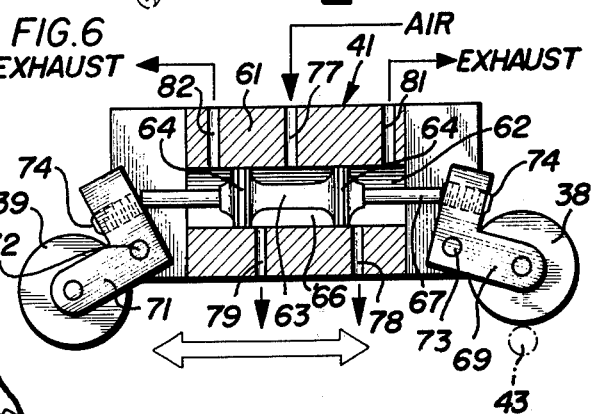
FIG. 6 is a plan view, in partial section, of the master valve controlling the pneumatic system used in the invention.

The construction of master valve 41 is illustrated in FIG. 6. As shown, the valve comprises a valve body 61 provided with a bore 62 which extends through its length. Situated within the bore is a spool assembly 63 provided with O-rings 64 which make a pneumatic seal with the walls of bore 62. The diameter of spool assembly 63 between the O-rings is substantially smaller than the diameter of bore 62, thus providing an annular zone 66 defined by O-rings 64 and bore 62.

The ends of spool assembly 63 are provided with stems 67 and 68 which project out of the ends of bore 62. Brackets 69 and 71, pivoted for rotation about pins 72 and 73, are positioned so that actuation by trip pin 43 of trip rollers 38 and 39 attached thereto will cause spool assembly 63 to move longitudinally in bore 62. Each of brackets 69 and 71 is provided with an adjustment bolt 74 to adjust the extent of movement of spool assembly 63.

Valve body 61 is provided with a number of ports through which the pneumatic control fluid flows during operation of the control system. Pneumatic fluid is supplied through port 77, passes through annular zone 66 and emerges through either port 78 or port 79, depending on the position of spool assembly 63. Port 79 is connected by hose 44 to the actuating systems for the locator rod 26 and coupler 28, while port 78 supplies pneumatic fluid to return cylinder 31 through line 42 and to bleeder valve 50 through hose 46. Ports 81 and 82 lead to atmosphere, for permitting the quick exhaust of the systems actuated through ports 78 and 79 respectively.

In the position shown in FIG. 6, pneumatic fluid is supplied to port 79, while port 78 is connected to atmosphere through port 81. When pin 43 engages trip roller 39, spool assembly 63 is moved to the right, thereby causing pneumatic fluid to be supplied to port 78 and permitting port 79 to exhaust to atmosphere through port 82.

The operation of the control system is as follows. In the position shown in solid outline in FIG. 2, roller 38 is engaged by trip pin 43 to shut off the supply of pneumatic fluid to return cylinder 31 and to permit the cylinder to exhaust. At the same time, the control system through valve 41 and hose 44 causes locator rod 26 to be extended from the body of carriage 22. As trolley wheel 12 engages locator rod 26 and causes carriage 22 to move along the length of guide rod 21, minor valve 51 is actuated as described in U.S. Pat. No. 2,990,916 to cause coupler 28 to be extended and to inject lubricant into fitting 13. In order to avoid damage to coupler 28, the control system limits the rate at which it is extended by throttling the supply of pneumatic fluid supplied to its actuating means. When carriage 22 has traveled far enough to cause trip pin 43 to engage trip roller 39, master valve 41 is actuated to energize return cylinder 31 and bleeder valve 50, which permits rapid exhaust of the propulsion means driving coupler 28, causing the coupler to retract rapidly. At the same time the propulsion system for locator rod 26 is deenergized, causing it to retract within carriage 22 out of the way of the moving trolley wheel 12. The actuation of return cylinder 31 causes its piston 32 to move from left to right in FIG. 2, return pin 33 engaging flange 37 on carriage 22 and thus returning carriage 22 to its initial position. At the end of the return portion of the cycle, trip pin 43 engages roller 38, deactivating return cylinder 31 and bleeder valve 50, and actuating locator rod 26 to start a new lubrication cycle.

As long as locator rod 26 and coupler 28 disengage from trolley wheel 12 after the lubricant injection in the intended manner, the lubricator assembly will continue to function automatically without any interruption. On occasion, however, locator rod 26 or coupler 28 may fail to retract or otherwise disengage from the trolley wheel. Even though trip roller 39 has actuated return cylinder 31 to start a return stroke, the continuing engagement of the locator rod 26 or coupler 28 with the trolley assembly will continue to move the lubricator toward contact with rear end plate 16, thereby possibly damaging the lubricator. In order to guard against this possibility, the invention provides an automatic safety cut-out and return feature. Roller support bar 18, on which support roller 24 rests, prevents carriage 22 from pivoting about guide rod 21, even though carriage 22 is unbalanced and would normally tend to pivot in this manner under the influence of gravity. At a point in the travel of the carriage 22 beyond which a possibility of damage to the equipment exists in the event that the lubricator is not disengaged from the moving conveyor, there is provided a notch 47 (FIG. 3) extending through the thickness of roller support bar 18 of a size sufficient to permit roller 24 to drop therethrough under the influence of gravity. As roller 24 falls, carriage 22 pivots about guide rod 21 and thereby causes locator rod 26 and coupler 28 to swing upwardly out of engagement with the conveyor. Attached to the under surface of bar 18 and spanning notch 47 therein is an elongated open loop 48 which is inclined downwardly in the direction of travel of the carriage during the lubrication portion of the cycle. When roller 24 reaches and falls through the notch 47 in bar 18, it enters the loop and moves toward the bottom of loop 48 in the position shown in dotted outline in FIG. 3, which also illustrates that locator rod 26 has swung out of engagement with the conveyor. In order to insure that roller 24 enters loop 48 and does not jump across notch 47, it is preferred to make loop 48 with arms 49, 51 of unequal length as shown, with the longer arm 51 extending above the top surface of support bar 18 on the far side of the notch 47. Thus, when roller 24 approaches notch 47, it is forced into it by arm 51 which the roller cannot cross.

During the sequence described above, trip pin 43 has actuated return cylinder 31 via roller 39, so there is exerted on carriage 22 through return pin 33 and flange 37 a restoring force which tends to move the carriage to the right in FIG. 2. Under the force exerted by return cylinder 31 and now unimpeded by engagement with the conveyor roller 24 rides on the inclined upper surface of leg 49 until it again rests on the top surface of support bar 18 and is returned to its start position for the start of a new lubricating cycle. The restoration of the lubricator to normal operating status after a safety cut-out occurs so rapidly that no down-time or delay in the operation of the equipment occurs.

Figure 4:
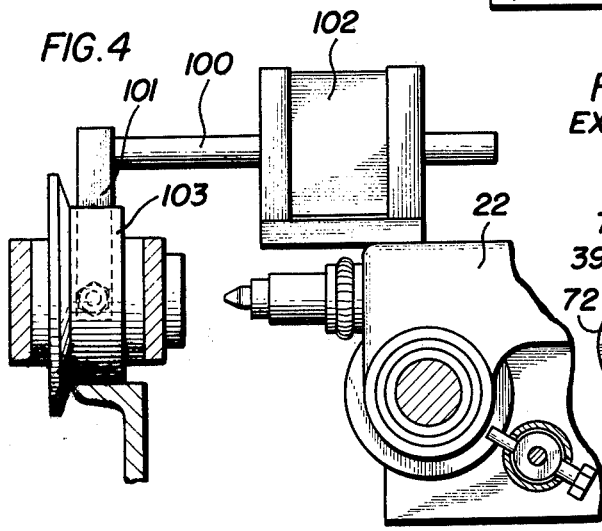
FIG. 4 is a detail of an alternative embodiment of the locator assembly which can be used with the invention.
Figure 5:
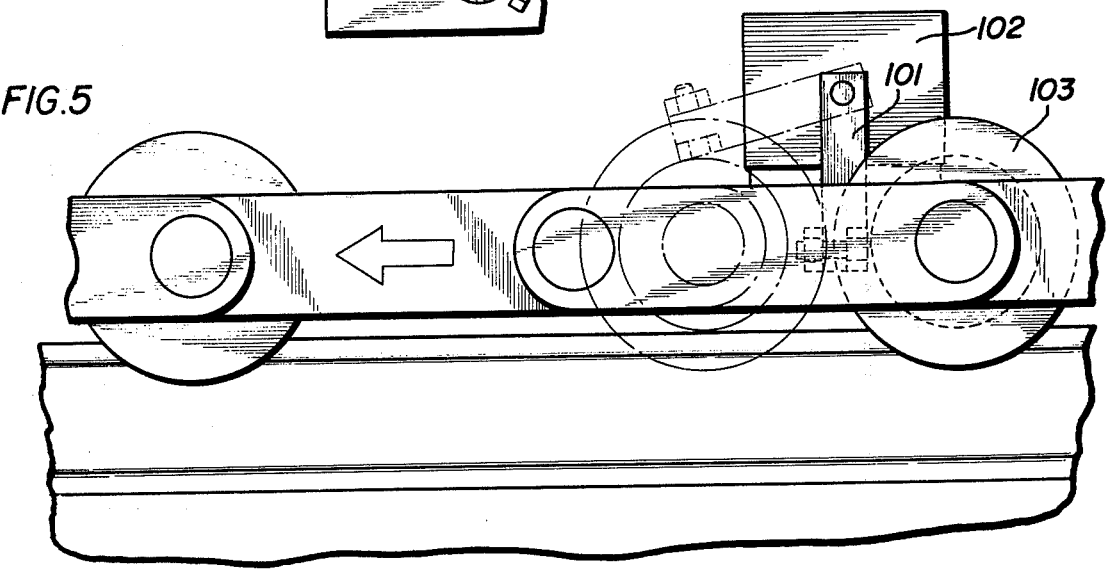
FIG. 5 is an elevational view from the left side of FIG. 4, illustrating the operation of the embodiment shown in FIG. 4.

Another embodiment of the invention in which a modified from of locator for positioning the lubricator of the invention in position to lubricate the wheel of a conveyor is shown in FIGS. 4 and 5. In some instances, it is not possible, because of the physical configuration of the conveyor assembly, to use a locator rod 26 such as that shown in FIGS. 1 and 3, i.e., one which is projected longitudinally to contact the conveyor. The embodiment shown in FIGS. 4 and 5 employs a locator shaft 100, equipped with bar 101 at one end. The other end of shaft 100 is operatively connected to a rotary valve system 102 actuated by the pneumatic control system of the lubricator. When actuated, rod 100 rotates to cause bar 101 to assume the vertical position shown in FIG. 5, in which it is in position to contact a wheel 103 of the conveyor. As the wheel moves along the conveyor, it moves carriage 22, to which the valve system 102 is attached, along guide rod 21 as previously described. At the end of the lubricating cycle, the pneumatic control system rotates bar 101 out of contact with the wheel (dotted outline in FIG. 5), thus disengaging the lubricator from the conveyor. The bar 101 is provided with an adjustment bolt 104 to adjust the distance from the contact surface which locates on the wheel with respect to the center of the coupler.

Other suitable types of locator systems can also be utilized and will be apparent to those skilled in the art.

The foregoing detailed description has been given for clearness of understanding only, and no unnecessary limitations should be understood therefrom, as modifications will be obvious to those skilled in the art.

What is claimed is:

1. In an automatic lubricator assembly for lubricating conveyor trolley wheels:

elongated guide means for guiding and supporting a movable carriage along a path to permit reciprocating movement thereof;

a carriage rotatably mounted on and movable along the length of said guide means from a starting position to a final position;

conveyor engaging means mounted on said carriage for engaging a moving conveyor and for permitting said carriage to be engaged and moved by and with said conveyor from said starting position along said guide means to said final position;

lubricating means on said carriage for lubricating a trolley wheel of said conveyor during the combined movement of said carriage and said conveyor;

return means for moving said carriage in a return direction to said starting position;

first control means actuated by movement of said carriage beyond a predetermined position for activating said return means, thereby returning said carriage to its starting position;

second control means for deactivating said return means when the starting position of said carriage is reached;

roller means mounted on said carriage for rollably supporting a portion of the weight of said carriage;

elongated roller support means arranged parallel to said guide means below and in supporting contact with said roller means, thereby preventing rotation of said carriage about said guide means during normal operation of said lubricator assembly, said roller support means including release means for permitting said carriage to rotate by gravity, when said carriage has gone beyond a predetermined position, from its normal operative supported position to a rotated position disengaging said conveyor engaging means from engagement with a conveyor; and reset means including an inclined surface leading downwardly from said roller support means to a position therebelow for supporting said roller means during the return of said roller means to its normal operative position during the return trip of said carriage to the starting position.

2. The lubricator assembly of claim 1 in which said support means includes a support bar, said support bar includes a notch of a size sufficient to permit said roller means to pass therethrough and said reset means includes an elongated open loop spanning said notch with the open end of said loop uppermost, one side of said loop comprising an inclined surface joined to an edge of said notch and leading downwardly from the top of said support bar in the forward direction of travel of said carraige.

3. The lubricator assembly of claim 2 in which the arms of said loop are of uneven length, the longer of which has a section which protrudes above the far edge of said notch, whereby said roller is forced into said notch when it comes in contact with said protruding section.

4. The lubricator assembly of claim 1 in which said first and second control means are incorporated in a master valve comprising:
   a valve body having a bore passing therethrough,
   a spool assembly forming a pneumatic seal with said bore and having a stem projecting from each open end of said bore, and
   trip means associated with each of said stems for moving said spool assembly into operative positions, said trip means being actuated by contact with a trip pin mounted on said carriage.

5. The lubricator assembly of claim 1 in which said conveyor engaging means comprises a locator shaft rotatably secured to said carriage, a bar transversely connected to said shaft, and control means for rotating said shaft between a first position in which said bar contacts and engages said conveyor, and a second portion in which said bar and said conveyor are disengaged.

* * * * *

UNITED STATES PATENT AND TRADEMARK OFFICE
CERTIFICATE OF CORRECTION

PATENT NO. : 3,895,690
DATED : July 22, 1975
INVENTOR(S) : RONALD E. THOMSON ET AL.

It is certified that error appears in the above-identified patent and that said Letters Patent are hereby corrected as shown below:

Col. 1, line 16 - "2,909,916" should be --2,990,916--

Col. 8, line 8 - "portion" should be --position--

Signed and Sealed this twenty-first Day of October 1975

[SEAL]

Attest:

RUTH C. MASON
Attesting Officer

C. MARSHALL DANN
Commissioner of Patents and Trademarks